(12) United States Patent
Ros

(10) Patent No.: US 12,229,710 B2
(45) Date of Patent: Feb. 18, 2025

(54) DATA LOGGER FOR ACQUIRING AND RECORDING SENSOR DATA ASSOCIATED WITH A TRANSPORT CONTAINER

(71) Applicant: REP IP AG, Zug (CH)

(72) Inventor: Nico Ros, Riehen (CH)

(73) Assignee: REP IP AG, Zug (CH)

( * ) Notice: Subject to any disclaimer, the term of this patent is extended or adjusted under 35 U.S.C. 154(b) by 0 days.

(21) Appl. No.: 18/033,924

(22) PCT Filed: Oct. 21, 2021

(86) PCT No.: PCT/IB2021/059701
§ 371 (c)(1),
(2) Date: Apr. 26, 2023

(87) PCT Pub. No.: WO2022/090875
PCT Pub. Date: May 5, 2022

(65) Prior Publication Data
US 2023/0419242 A1 Dec. 28, 2023

(30) Foreign Application Priority Data

Oct. 28, 2020 (EP) ..................................... 20020495

(51) Int. Cl.
*G06Q 10/0833* (2023.01)
*G06Q 10/0832* (2023.01)
(52) U.S. Cl.
CPC ..... *G06Q 10/0833* (2013.01); *G06Q 10/0832* (2013.01)
(58) Field of Classification Search
CPC ........................ G06Q 10/0833; G06Q 10/0832
See application file for complete search history.

(56) References Cited

U.S. PATENT DOCUMENTS

2002/0082787 A1    6/2002  Woodworth et al.
2009/0224869 A1*   9/2009  Baker .................... G07C 5/008
                                                    340/5.1
(Continued)

OTHER PUBLICATIONS

Sasank Reddy. Using mobile phones to determine transportation modes, 2010, p. 2-3 (Year: 2010).*

(Continued)

*Primary Examiner* — Ibrahim N El-Bathy
(74) *Attorney, Agent, or Firm* — Liang & Hennessey LLP; Brian Hennessey

(57) ABSTRACT

A data logger for acquiring and recording sensor data associated with a transport container includes a first sensor, a memory for the storage of sensor data acquired by the first sensor, a radio-frequency module for wirelessly transmitting the sensor data, a battery, a second sensor for sensing a transport mode of the transport container, and an energy management circuitry that is connected with the second sensor and with the radio-frequency module. The energy management circuitry is configured to switch between a plurality of operation modes including a default operation mode in which the radio-frequency module sends sensor data according to a defined time pattern that is independent of a transport mode. The operation modes further include at least one transport operation mode in which the radio-frequency module sends sensor data according to a time pattern that is dependent on the transport mode sensed by the second sensor.

16 Claims, 2 Drawing Sheets

(56) References Cited

U.S. PATENT DOCUMENTS

2013/0321122 A1* 12/2013 Lee .................... G06Q 10/0833
                                                    340/3.1
2020/0128358 A1*  4/2020 Komoni ................ H04W 4/027
2021/0282419 A1*  9/2021 Chopko ................. G06Q 50/40

OTHER PUBLICATIONS

International Search Report and Written Opinion received in PCT/IB2021/059701 dated Dec. 23, 2021, pp. 12.

* cited by examiner

DATA LOGGER FOR ACQUIRING AND RECORDING SENSOR DATA ASSOCIATED WITH A TRANSPORT CONTAINER

CROSS-REFERENCE TO RELATED APPLICATIONS

The present application is a national phase application of PCT Application No. PCT/IB2021/059701, filed Oct. 21, 2021, entitled "DATA LOGGER FOR ACQUIRING AND RECORDING SENSOR DATA ASSOCIATED WITH A TRANSPORT CONTAINER", which claims the benefit of European Patent Application No. 20020495.6, filed Oct. 28, 2020, each of which is incorporated by reference in its entirety.

BACKGROUND OF THE INVENTION

1. Field of the Invention

The invention refers to a data logger for acquiring and recording sensor data associated with a transport container, comprising at least one first sensor, a memory for the storage of sensor data acquired by the at least one first sensor, a radio-frequency module for wirelessly transmitting said sensor data, a battery and at least one second sensor for sensing a transport mode of the transport container.

2. Description of the Related Art

Data loggers are electronic devices that record data with built-in sensors. They generally are small, battery powered, portable, and equipped with a microprocessor, internal memory for data storage, and sensors. Data loggers can be used with transport containers to track the geographical position of the container during its itinerary and/or to record environmental data that may be critical for the transported goods during shipments, such as temperature, humidity, etc. In particular, data loggers may be used to log the temperature inside the transport container during shipment in order to assess, whether the transported goods have been kept within a specified low-temperature range. Generally speaking, data loggers may be used to provide evidence of product temperature along a temperature-controlled supply chain.

Data loggers for aircraft shipping that are provided with an integrated data transmitter, such as a radio-frequency module, for wirelessly transmitting their sensor data to a remote system may, however, interfere with the aircraft's navigation or communication systems. Therefore, there has been particular interest in developing devices capable of detecting the presence of operational aircraft to comply with Federal Aviation Regulations. Federal Aviation Regulations restrict the use and operation of wireless communication electronics, and in general the use of electronic devices aboard or in close vicinity of an aircraft, unless proven these do not interfere with navigation or communication systems. The term "close vicinity" is indicative of a distance from an operational aircraft whereby the RF (radio frequency) transmissions emanating from a device not native to the aircraft could potentially cause interference.

U.S. Pat. No. 7,791,455B1 discloses an RF transmitting apparatus, which provides for a normally OFF state of its signal transmission circuitry. The device comprises condition sensing means operable to determine when said RF signal transmitting apparatus is in the immediate vicinity of aircraft, and modifying means, connected to the RF signal transmission circuitry and said condition sensing means, said modifying means operating, only when each of said condition sensing means determines said RF signal transmitting apparatus is not in the immediate vicinity of aircraft, to alter the signal transmission capability of said RF signal transmission circuitry to an ON condition.

Conversely, U.S. Pat. No. 6,281,797 B1 refers to a device for determining the location of a container. The device includes a sensor for receiving information which is used to determine when the container is in proximity to a transportation vessel to deactivate said tracking device. Overall, U.S. Pat. No. 6,281,797 B1 protects the procedure for deactivating a tracking that senses when the container it is associated to is in the proximity of a transportation vessel. The patent also specifies possible environmental sensors for detecting the surroundings of the container, including reception of position information, acoustics, frequency, pressure, altitude, motion, vibration, and imaging.

U.S. Pat. No. 9,194,932 refers to a system with a sensor technology to deactivate the tracking or transmissions prior to aircraft take-off and reactivate after landing yet before taxiing, to comply with FAA regulations. The tracking system which eliminates the need for bulky lithium-based batteries from the tracking or transmitter devices to enhance safety and operational ease, uses an array of machine vision sensors to activate and deactivate. Other versions of the tracking systems also feature LTE communication devices with a global roaming SIM card to realize true global operation to support GSM, CDMA and other mobile environments.

EP 2853098 B1 relates to aircraft status detection, including aircraft take-off, landing, flying, and aircraft proximity detection. The invention relates to a low power method for determining whether a cargo destined for air transport is in a flying aircraft, using an accelerometer for detecting a linear acceleration, a gyroscope for detecting an angular rate, both of which are then passed to a controller to generate a flight status output signal indicating whether the housing is in a flying state as a function of the linear acceleration signal and angular rate signal.

US 2009/288520 A1 refers to a monitoring device for detecting loading and unloading events of cargo containers. The invention is comprised of a timer, a barometer, a positioning module, and a wireless communication module. The controller processes the pressure measurements and applies an algorithm to determine the loading and unloading from a means of transport.

An additional requirement for data loggers that shall be suitable for aircraft shipping is that the circuitry must be powered with a single cell battery, or standard AA or AAA battery to guarantee that the logger abides by Federal Aviation Regulations enabling it to fly as a non-dangerous good (DGR). Due to the limited capacity of such batteries, the runtime of data loggers between battery replacements is short.

SUMMARY OF THE INVENTION

Therefore, the instant invention aims at improving data loggers for aircraft shipping so as to extend the runtime, while safeguarding that the logger abides by Federal Aviation Regulations enabling it to fly as a non-dangerous good (DGR).

Further, the data transmission capability of the data logger shall be guaranteed even if at least one second sensor for sensing a transport mode of the transport container is non-functional.

In order to solve these and other objectives, the invention provides a data logger for acquiring and recording sensor data associated with a transport container as mentioned at the outset, that is characterized by an energy management circuitry that is connected with the at least one second sensor and with the radio-frequency module, wherein the energy management circuitry is configured to switch between a plurality of operation modes, wherein the plurality of operation modes comprise a default operation mode, in which the radio-frequency module sends sensor data according to a defined time pattern that is independent of a transport mode sensed by said at least one second sensor, and wherein the plurality of operation modes further comprise at least one transport operation mode, in which the radio-frequency module sends sensor data according to a time pattern that is dependent on the transport mode sensed by said at least one second sensor.

Therefore, the invention is based on the idea to provide an energy management circuitry that controls the operation modes of the data logger. The operation mode determines the time pattern according to which sensor data is sent via the radio-frequency module. In this way, time patterns may be optimized to send sensor data as rarely as possible, but still so frequently that the transport goods can be tracked or remotely monitored as to specific environmental conditions. Optimizing the time pattern used to send sensor data via the radio-frequency module contributes to a significant reduction of the energy consumption, since the radio-frequency module has a relatively high electric power consumption.

In particular, the time pattern according to which sensor data is sent via the radio-frequency module may be adapted to the specific transport mode of the transport container as sensed by the at least one second sensor. For example, a time pattern selected for the transport by truck may be different from a time pattern that is selected for the transport by aircraft.

According to the invention, the plurality of operation modes comprises a default operation mode and at least one transport operation mode. The default operation mode is assumed if no other operation mode is selected. In particular, in the default operation mode sensor data is sent via the radio-frequency module according to a defined time pattern that is independent of a transport mode sensed by the at least one second sensor. Since the default operation mode is independent of a transport mode sensed by the at least one second sensor, the data logger does not rely on the presence of sensor signals obtained from the at least one second sensor in order to assume said default operation mode. In this way, the data logger can fall back into the default operation mode and send sensor data even in case the at least one second sensor is non-functional and thus cannot determine a specific transport mode.

The time pattern used in the default operation mode that is independent of a transport mode sensed by the at least one second sensor may comprise sending sensor data at regular time intervals ranging from 1 to 48 hours, i.e. sensor data are sent every 1 h, every 2 h, every 3 h, . . . or every 24 h . . . or every 48 h. Preferably, a regular time interval of 24 hours is selected.

In contrast, the at least one transport operation mode is assumed when the at least one second sensor senses a respective transport mode, wherein the time pattern according to which sensor data is sent via the radio-frequency module is specific to the respective transport mode.

The switching between the various operation modes can be triggered by different events. One possibility is that the switching is triggered by the sensing of a transport mode by the at least one second sensor. In this context, a preferred embedment of the data logger provides that the energy management circuitry is configured to switch from the default operation mode to a transport operation mode, if a transport mode is sensed by the at least one second sensor.

Another possibility is that the switching between operation modes is triggered by a command received from a remote-control device, such as a gateway, that the transport container passes or a remote computer. In this context, a preferred embodiment of the invention provides that the data logger further comprises a data receiver that is connected to the energy management circuitry for wirelessly receiving data from a gateway or a remote computer, wherein the energy management circuitry is configured to switch from the default operation mode to a transport operation mode, if a transport mode command is received via the data receiver.

According to another preferred embodiment, the energy management circuitry is configured to switch from a transport operation mode to the default operation mode, if no sensor data is received from said at least one second sensor during a defined time period. The absence of sensor data received from the at least one second sensor could be indicative of a sensor failure, following which the data logger returns to the default operation mode.

Alternatively, the data logger returns to the default operation mode under the additional condition that no transport mode command is received. In this context, a preferred embodiment of the invention provides that the energy management circuitry is configured to switch from a transport operation mode to the default operation mode, if no sensor data is received from said at least one second sensor and no transport mode command is received via the data receiver during a defined time period.

As mentioned above, the energy consumption of the data logger may be substantially reduced, if the time pattern for wirelessly transmitting sensor data acquired by said first sensor via the radio-frequency module is adapted to the specific operation mode. Therefore, according to a preferred embodiment, the energy management circuitry comprises a memory for the storage of time pattern data representative of a plurality of time patterns, wherein each time pattern is assigned to one of said operation modes.

As used herein, a time pattern defines time intervals or points in time, at which sensor data acquired by said first sensor is wirelessly transmitted via the radio-frequency module. The time pattern may define periodic transmission events, such as transmission events happening every n seconds, minutes or hours, where n is an integer between 1 and 60. Alternatively, the time pattern may define irregular time intervals. Alternatively, the time pattern may comprise conditional instructions for trigger transmission events depending on the incidence of specific triggering events, such as that the sensor data obtained from said at least one first sensor reaches a defined threshold value. Alternatively, the time pattern may also define that no transmission events at all shall be scheduled as long as the respective transport operation mode is persisting.

For example, it would be beneficial to automatically stop the wireless transmission of sensor data during an aircraft shipping period so as not to interfere with the aircraft's navigation or communication systems. Therefore, according to a preferred embodiment of the invention, the at least one transport operation mode comprises an aircraft transportation operation mode, wherein the time pattern assigned to said aircraft transportation operation mode defines not sending sensor data at any time, thus preserving power for the duration of the flight.

Preferably, the at least one transport operation mode comprises a truck transportation operation mode, wherein the time pattern assigned to said truck transportation operation mode defines sending sensor data at time intervals ranging from 1 to 60 minutes depending on the velocity of the truck. If the truck is stationary, then data such as location can be sent every 60 minutes, but if the truck begins moving location data will be sent at a higher interval rate.

Preferably, the at least one transport operation mode comprises a sea transportation operation mode, wherein the time pattern assigned to said sea transportation operation mode defines sending sensor data at regular time intervals, excluding the periods of time when it is navigating through the sea, as no gateway would be in reach of the logger.

Further, a dedicated time pattern may be provided in case the transport container is detected to be placed in a storage condition, thus not be moved for a longer period of time. Therefore, a preferred embodiment provides that the at least one transport operation mode comprises a storage mode, wherein the time pattern assigned to said storage mode defines sending sensor data at time intervals of once every 24 hours or when said at least one second sensor detects a displacement of the data logger.

Further, in another operating mode, the triggering event for initiating the sending of sensor data over the radio-frequency module may also be a function on the data acquired by the first sensor itself, i.e. in an extrema mode the logger shall only transmit sensor data when the temperature or any other sensor quantity breaches a predefined threshold. In this context, a preferred embodiment provides that at least one transport operation mode comprises an extrema mode, wherein the time pattern assigned to said storage mode comprises sending sensor data via the radio-frequency module at points in time, when the sensor data obtained from said at least one first sensor breaches a defined threshold value.

A variety of sensor types may be used for sensing the transport mode. Preferably, said at least one second sensor is selected from the group consisting of a positioning system, an accelerometer, an air pressure sensor, an acoustic sensor, a frequency sensor, an imaging sensor, a motion sensor, a hazardous material sensor, a capacitance sensor, an optical marker, a capacitance marker, an ultrasonic marker, an IR beacon, a frequency beacon and a magnetic marker. Any one of such sensors may be used alone or at least two of said sensors may be used in combination to detect the transport mode. Preferably, the energy management circuitry is configured to sense a transport mode based on the combined evaluation of sensor data obtained from at least two of said second sensors.

As an aircraft climbs, the outside air pressure drops and so does that of the inside cabin. The rate of pressure change, in commercial jet aircraft, is typically in the range of 10.2 to 17.0 mbar/min for altitudes under 1500 meters or approximately 90-150 meter per minute. Given this information, the air pressure sensor can signal to the energy management circuitry that it is in an air transport, and as such deactivate transmissions to save power for the duration of the flight. The air pressure sensor can also measure abrupt changes in pressure, such as when a door closes or the data logger enters a tunnel. These parameters can be fed into the energy management circuitry to detect these changes based on the mode of operation.

Alternatively, the data logger can also make use of sound sensing, a distinct example is the sound emanating from a jet engine. Jet engines consistently generate sounds in the range of 100 to 350 KHz from the time of takeoff until they are throttled back for landing. Given this information, the sound sensor can signal to the logger when it is in proximity of an operational aircraft to deactivate transmissions. Such method of detection can also be implemented in a truck transport operation mode whereby a sound sensor could detect engine or road sound frequencies. Moreover, in the specific case of detecting an operational aircraft, the air pressure and sound sensor could work as redundant systems.

The data logger can make use of an accelerometer to detect the acceleration and deceleration occur during take-off and landing of an aircraft. During take-off, an aircraft exhibits an acceleration signal between 0.01 Hz and 0.1 Hz in combination with a magnitude of 0.2 to 0.5 g. Similarly, the data logger can make use of the accelerometer axis perpendicular to the road to determine if it is being transported in a truck. Trucking can be characterized by transport shock which exhibits recurrent, decaying sinusoidal pulse at frequencies below 20 Hz. Moreover, continuous background vibration has been shown to be random, with a Gaussian amplitude distribution. The accelerometer can also measure events that have a high shock damage potential, particularly dips, bumps, chuckholes, and railroad crossings which exhibit natural frequencies below 15 Hz.

The data logger can alternatively detect different transportation vessels based on the frequency they emit. For example, the logger can sense aircraft in the vicinity by detecting the emitted 400 Hz frequency from AC power systems (worldwide standard in aviation).

As to the first sensor, the data of which is transmitted via the radio-frequency module, various types of sensor may be used. Preferably, said at least one first sensor is selected from the group consisting of a position tracking system, a temperature sensor and a light sensor.

In specific cases, a sensor may function both as a first sensor and as a second sensor. Alternatively, the at least one first sensor and the at least one second sensor are distinct units.

Additional power saving may be achieved, if the transport mode detected by the at least one second sensor is not only used to select a time pattern applied to transmissions via the radio-frequency module of sensor data obtained from the at least one first sensor, but also for selecting a suitable frequency of the acquisition of sensor data by said at least one first sensor. Therefore, a preferred embodiment provides that the energy management circuitry stores further time pattern data representative of a plurality of further time patterns, wherein each further time pattern is assigned to one of said operation modes, and wherein the energy management circuitry is configured to trigger the acquisition of sensor data by said first sensor according to the further time pattern that is assigned to the transport mode sensed by said at least one second sensor.

Due to the energy savings provided by the invention, the data logger can be supplied with electrical energy by a battery having a capacity of 500 to 5000 mAh with less than or equal to 0.3 g lithium metal content to ensure non DGR (dangerous good) status. Preferably, the battery is a single coin cell or button cell.

Preferably, the radio-frequency module is configured to use low-power network (LPN) system to transmit sensor data, thus providing extended range of connectivity of up to 20 km.

Among the various LPN-platforms and technologies, the LoRa (Long Range) system is preferred. LoRa is a low-power wide-area network technology that is based on spread spectrum modulation techniques derived from chirp spread spectrum.

The radio-frequency module working according to the LoRa system can achieve data-rates from 50 bit/s up to 50.5 kbit/s.

With a band width of 125 kHz, assuming continuous sensor sampling every 10 minutes with a 1000 mAh single cell battery, and spread factor between 12 to 7, the LoRa data logger can achieve a runtime of 2.3 to 5.47 months, respectively.

To sum up, while a small battery is required to fly as a non-dangerous good (DGR), the instant invention aims at optimizing power management through operating modes to guarantee a long battery life. A prolonged battery life ensures the logger can be used and reused for longer periods of time. The latter lowers costs, increases sustainability by reducing the environmental footprint, as the change of the battery can be so expensive that it is cheaper to throw the logger away, thus the battery life defines the life of the logger. Furthermore, long battery life extends the time between recalibration of the loggers, process which may be required subsequent to a battery exchange. Lastly, longer battery life opens up the possibility for building loggers fixed into products with a lifespan from several months up to around one year. The invention refers to a data logger for acquiring and recording sensor data associated with a transport container, comprising at least one first sensor, a memory for the storage of sensor data acquired by the at least one first sensor, a radio-frequency module for wirelessly transmitting said sensor data, a battery and at least one second sensor for sensing a transport mode of the transport container.

DETAILED DESCRIPTION

Figure 1:
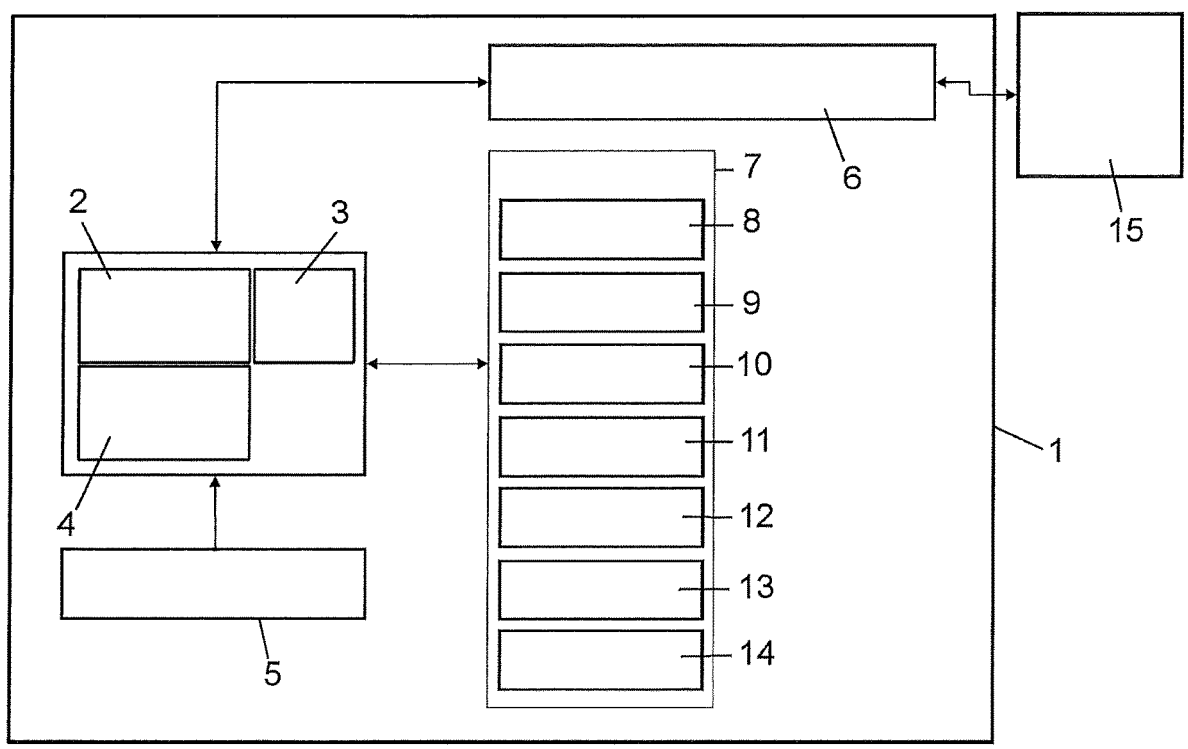
FIG. 1 is a data logger according to an exemplary embodiment.

In FIG. 1, the data logger is designated by reference numeral 1. The data logger 1 comprises a microprocessor processing unit 2, a memory 3 and an energy management circuitry 4. The electronic components of the data logger 1 are supplied with electrical energy by power source 5, such as a single cell battery. Further, a set of sensors 7 is provided, comprising a first sensor 8, such as a position tracking system and/or a temperature sensor 9, and comprising a plurality of second sensors for sensing a transport mode of the data logger 1. The second sensors comprise an accelerometer 9, an air pressure sensor 10, an acoustic sensor 11, an imaging sensor 12, a motion sensor 13 and a capacitance sensor 14. Sensor data acquired by the first sensor 8 is supplied to the memory 3 for the storage of the sensor data. Sensor data acquired by the second sensors is supplied to the energy management circuitry 4 that is configured to perform algorithms in order to sense a transport mode based on said sensor data. The energy management circuitry 4 is configured to switch between a plurality of operation modes, wherein a time pattern of transmission events is assigned to each operation mode. To this end, a radio-frequency module 6 is provided that is controlled by the energy management circuitry 4 to transmit sensor data according to the respective time pattern. The memory 3 is connected to the radio-frequency module 6 to feed the sensor data acquired by the at least one first sensor 7 to the radio-frequency module 6, said sensor data being wirelessly transmitted to a gateway 15, such as a gateway belonging to a low-power network (LPN) system.

Figure 2:
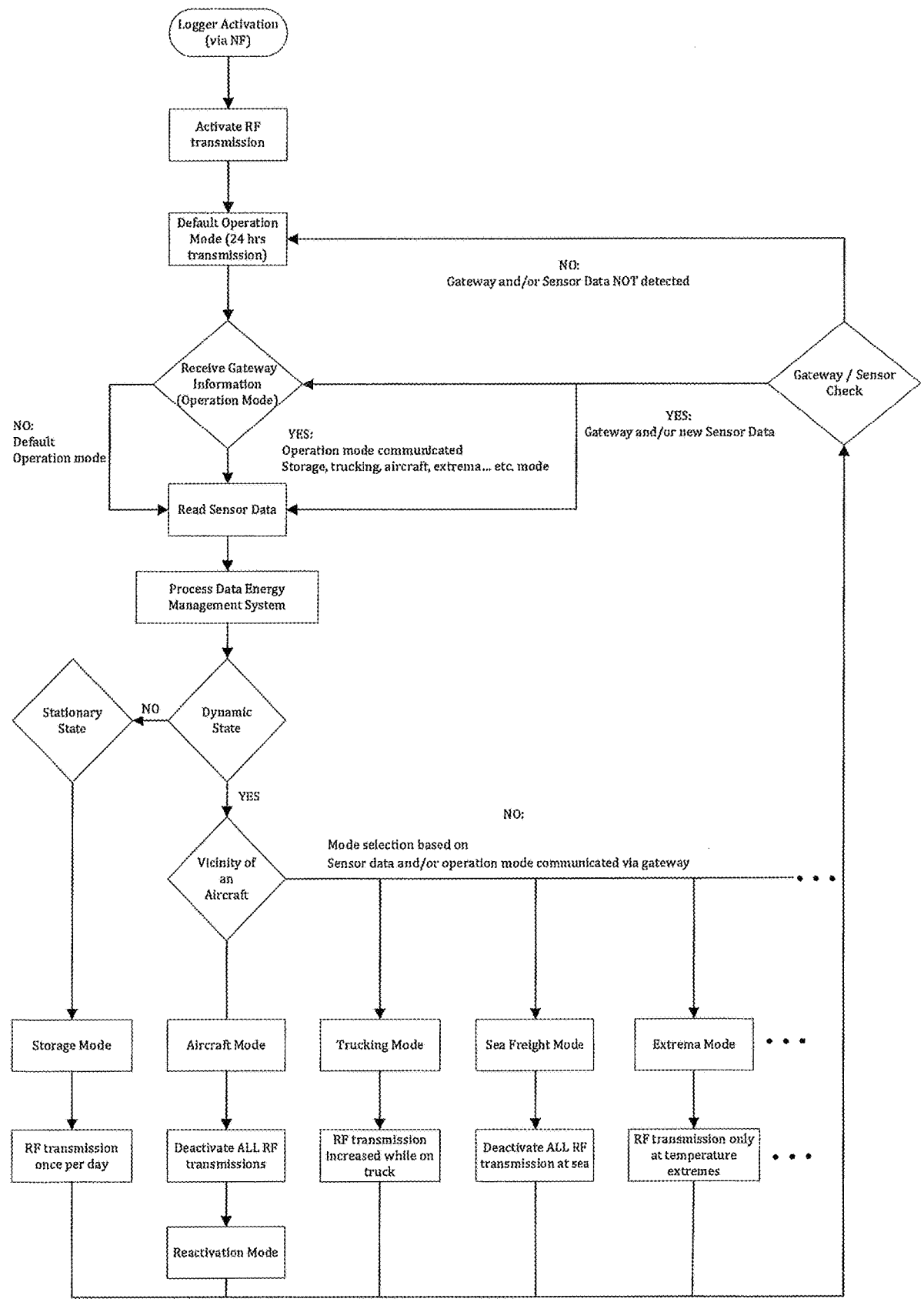
FIG. 2 is a flow diagram showing an exemplary method according to the present technology.

In FIG. 2 is flow diagram showing the logical flow from activation of the data logger to operation, including the switching between operation modes.

First, the data logger is activated, for example by means of a near field signal that is received by the data logger. Subsequently, the radio-frequency module of the data logger is activated and the energy management circuitry sets the logger into a default operation mode, in which the radio-frequency module sends sensor data via the radio-frequency module according to a defined time pattern, for example once every 24 hours.

The next step in the management process is to remotely provide to the data logger, through a LPN gateway, with a transport mode command, that defines the transport operation mode the logger must initially follow. Once the transport operation mode is set, the energy management circuitry optimizes power consumption of the data logger by determining the transport mode of the logger, changing the transport operation mode if required, thereby adapting the sensing rate of the at least one first sensor and the transmission rate of the radio-frequency module.

For example, if the energy management circuitry, by evaluating the sensor data received from the at least one second sensor, detects a dynamic state of the data logger, the next step is to detect, whether the data logger is in the vicinity of an aircraft. In the affirmative, the aircraft transport operation mode is selected, resulting in a deactivation of the radio-frequency module. In the negative, the energy management circuitry, by evaluating the sensor data received from the at least one second sensor, detects whether the data logger is being transported in a truck, by sea or otherwise, wherein a truck transport operation or a sea transport operation mode is activated, respectively. Alternatively, the selection of the respective transport operation mode may be triggered by a transport mode command that is received from the LPN gateway.

If the energy management circuitry, by evaluating the sensor data received from the at least one second sensor, detects a stationary state of the data logger, a storage mode is selected, wherein the radio-frequency module sends sensor data via the radio-frequency module according to a defined time pattern, for example once every 24 hours.

At regular intervals, a gateway/sensor check is performed, in order to establish, whether gateway and/or new sensor data is available. In the affirmative, depending on the data received the transport operation mode is changed or kept as is. In the negative, the data logger falls back into the default operation mode.

The invention claimed is:

1. A data logger for acquiring and recording sensor data associated with a transport container, comprising:
   at least one first sensor;
   a memory for the storage of sensor data acquired by the at least one first sensor;
   a radio-frequency module for wirelessly transmitting said sensor data;
   a battery;
   at least one second sensor for sensing a transport mode of the transport container; and
   an energy management circuitry connected with the at least one second sensor and connected with the radio-frequency module, the energy management circuitry configured to switch between a plurality of operation modes;

wherein the plurality of operation modes comprise a default operation mode, in which the radio-frequency module sends sensor data according to a defined time pattern independent of a transport mode sensed by said at least one second sensor;

wherein the plurality of operation modes further comprise at least one transport operation mode, in which the radio-frequency module sends sensor data according to a time pattern that is dependent on the transport mode sensed by said at least one second sensor; and wherein the energy management circuitry is configured to switch from the at least one transport operation mode to the default operation mode if said at least one second sensor fails during a defined time period.

2. The data logger according to claim 1, wherein the energy management circuitry is configured to switch from the default operation mode to a transport operation mode if a transport mode is sensed by the at least one second sensor.

3. The data logger according to claim 1, further comprising a data receiver connected to the energy management circuitry for wirelessly receiving data from a gateway or a remote computer;

wherein the energy management circuitry is configured to switch from the default operation mode to a transport operation mode if a transport mode command is received via the data receiver.

4. The data logger according to claim 3, wherein the energy management circuitry is configured to switch from a transport operation mode to the default operation mode if no sensor data is received from said at least one second sensor and no transport mode command is received via the data receiver during a defined time period.

5. The data logger according to claim 1, wherein:
the energy management circuitry comprises a memory for the storage of time pattern data representative of a plurality of time patterns; and
each time pattern is assigned to one of said operation modes.

6. The data logger according to claim 1, wherein:
the at least one transport operation mode comprises an aircraft transportation operation mode; and
the time pattern assigned to said aircraft transportation operation mode defines not sending sensor data at any time.

7. The data logger according to claim 1, wherein:
the at least one transport operation mode comprises a truck transportation operation mode; and
the time pattern assigned to said truck transportation operation mode defines sending sensor data at time intervals ranging from 1 to 60 minutes.

8. The data logger according to claim 7, wherein the time interval is a function of the velocity of the truck as sensed by the at least one second sensor.

9. The data logger according to claim 1, wherein:
the at least one transport operation mode comprises a sea transportation operation mode; and
the time pattern assigned to said sea transportation operation mode defines sending sensor data at regular time intervals, excluding the periods of time when the at least one second sensor senses the transport container is navigating through the sea.

10. The data logger according to claim 1, wherein:
the at least one transport operation mode comprises a storage mode; and
the time pattern assigned to said storage mode defines sending sensor data at time intervals of once every n hours, n being in a range of 1 to 24.

11. The data logger according to claim 10, wherein the time pattern assigned to said storage mode defines sending sensor data at time intervals of once every 24 hours.

12. The data logger according to claim 1, wherein:
the at least one transport operation mode comprises an extrema mode; and
the time pattern assigned to said extrema mode comprises sending sensor data via the radio-frequency module at points in time when the sensor data obtained from said at least one first sensor reaches a defined threshold value.

13. The data logger according to claim 1, wherein said at least one second sensor is selected from the group consisting of a positioning system, an accelerometer, an air pressure sensor, an acoustic sensor, a frequency sensor, an imaging sensor, a motion sensor, a hazardous material sensor, a capacitance sensor, an optical marker, a capacitance marker, an ultrasonic marker, an IR beacon, a frequency beacon, and a magnetic marker.

14. The data logger according to claim 1, wherein said at least one first sensor is selected from the group consisting of a position tracking system, a temperature sensor, and a light sensor.

15. The data logger according to claim 1, wherein the energy management circuitry is configured to sense a transport mode based on the combined evaluation of sensor data obtained from at least two second sensors.

16. The data logger according to claim 1, wherein:
the energy management circuitry stores further time pattern data representative of a plurality of further time patterns;
each further time pattern is assigned to one of said operation modes; and
the energy management circuitry is configured to trigger the acquisition of sensor data by said first sensor according to the further time pattern that is assigned to the transport mode sensed by said at least one second sensor.

* * * * *